(No Model.)
W. W. RITCHEY.
CHURN.
No. 361,186. Patented Apr. 12, 1887.
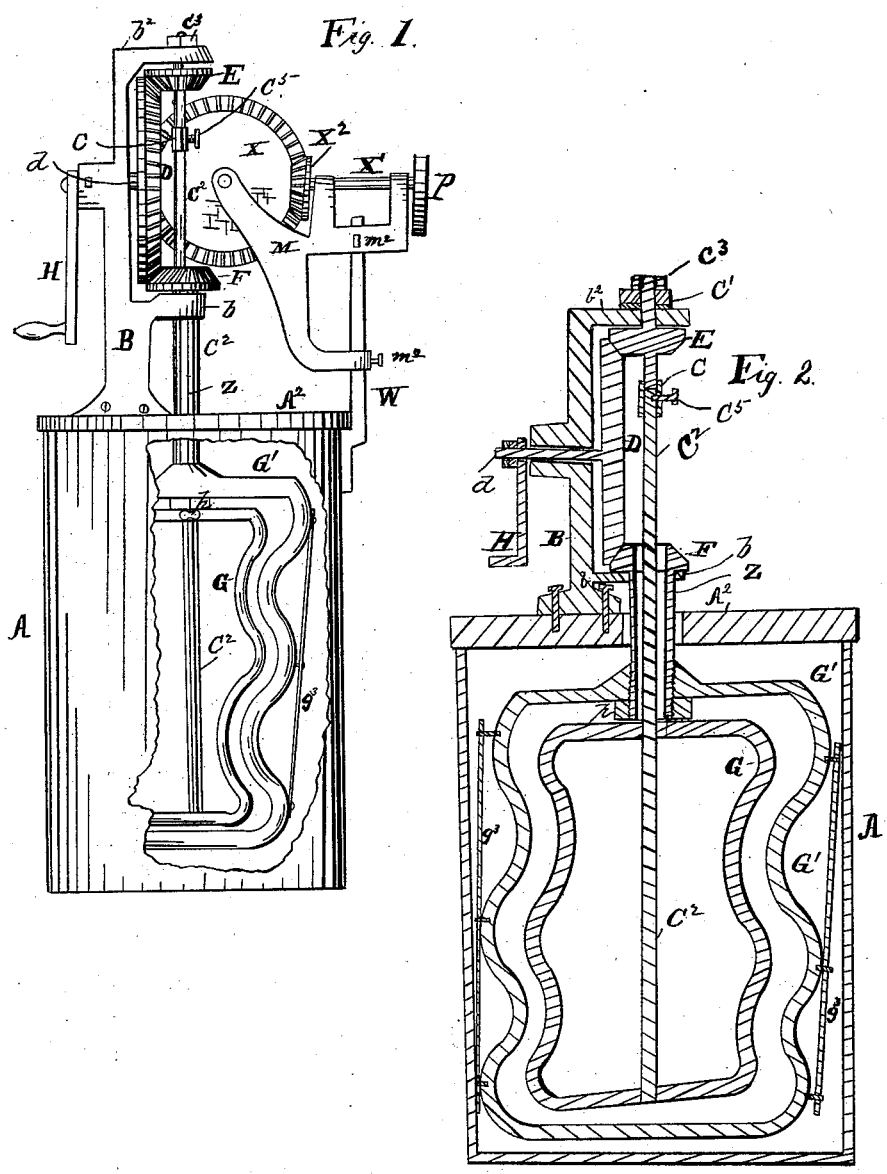
Witnesses.
N. A. Haseltine.
A. G. Smith.
Inventor
William W. Ritchey
By S. A. & S. C. Haseltine
attys

UNITED STATES PATENT OFFICE.

WILLIAM W. RITCHEY, OF ARCHIE, MISSOURI.

CHURN.

SPECIFICATION forming part of Letters Patent No. 361,186, dated April 12, 1887.

Application filed July 23, 1886. Serial No. 208,843. (No model.)

*To all whom it may concern:*

Be it known that I, WILLIAM W. RITCHEY, a citizen of the United States, residing at Archie, in the county of Cass and State of Missouri, have invented certain new and useful Improvements in Churns; and I do hereby declare the following to be a full, clear, and exact description of the invention, such as will enable others skilled in the art to which it appertains to make and use the same.

This invention relates to improvements in churns or ice-cream freezers with provision for driving a buffing-wheel or other device, which improvements will be fully understood from the following description, taken in connection with the annexed drawings.

Figure 1 is an elevation of the improved device, a portion of the vessel of which is broken away to show parts of the contained dashers. Fig. 2 is a vertical diametrical section through the device.

Referring to the annexed drawings by letters, A designates a vessel of suitable capacity, preferably cylindrical, and provided with a removable cover, $A^2$, through which is a central aperture.

G designates a dasher of an open or skeleton form having vertical bars formed entire with horizontal bars. This dasher is suitably secured to a dash-rod, $C^2$, which is connected to the lower stem of a beveled pinion, E, by a socket-piece, C, and a set-screw, $C^5$. This upper stem of this pinion E passes through an arm, $b^2$, of a standard, B, rigidly secured to the cover $A^2$, and receives a nut, $C^3$, on it, and, if desired, a washer, $C'$. Pinion E engages with a large bevel gear-wheel, D, the shaft $d$ of which is journaled in the said standard B and bears a winch, H. This wheel D engages with a pinion, F, on the upper end of a tube, Z, which is journaled in the arm $b$ of said standard B, and revolving freely through it is the dasher-rod $C^2$.

G' designates the outer dasher, of a similar shape to the inner dasher, G, and it is removably secured on the screw-threaded end of the tube Z by means of a nut, $p$. By these means the outer dasher, G', can be vertically adjusted on the tube Z to properly adapt it to the dasher G, or the dasher G' can be removed from its sleeve, when necessary, by simply removing the said nut $p$, the dashers first being removed from the vessel A. The waved portions of the outer dasher, G', are oblique to the dasher-rod $C^2$, as shown in the drawings, and have suitably secured to them straight stirring and clearing blades $g^3$, which are inclined in the same direction with respect to the inner sides of the vessel A, as shown in the annexed drawings, Fig. 2. It will then be seen that while the upper end of one blade is clearing the cream from the side of the vessel A the lower part of the opposite blade is clearing the cream from the opposite side of this vessel, and vice versa. The blades thus diagonally or obliquely arranged not only serve as clearers, but they also serve as stirrers to prevent the cream becoming lumpy while being frozen.

It will be observed that when the gear-wheel D is rotated the dashers receive rotation in opposite directions; also, that the dashers are readily removable from the rod and sleeve.

W designates a standard rigidly secured to the sides of the vessel A, round in cross-section, and M designates a bracket-bearing, which can be turned about the standard W when the set-screws $m^2$ are loosened. This standard affords a journal-bearing for the short shaft of a bevel spur-wheel, X, adapted to engage with the gear-wheel D when in the position shown in Fig. 1. The spur-wheel X engages with a pinion, $X^2$, on a horizontal shaft, $X'$, also journaled in the standard M.

I have represented a buffer or grinding wheel, P, on the outer side of the shaft $X'$, which may be rapidly rotated by turning the winch H; but I contemplate the device for transmitting motion to a coffee-mill, salt-pulverizer, and other light driving devices. By loosening the set-screws $m^2$ $m^2$ the bracket M can be swung around, relieving the wheel X from the wheel D.

Having described my invention, what I claim is—

1. In a churn or freezer, the combination, with the waved dasher G', of the clearing-blades $g^3$, obliquely arranged with respect to the dasher-shaft, substantially as described.

2. The combination, with the vessel A and its removable cover, of the waved dashers G G', the dasher-rod $C^2$, coupled by a socket and set-screw to the lower stem of the spur-wheel E, the wheel being sustained by the arm of a standard, B, and by means of a nut, the dasher G', adjustably and removably secured to the tube Z, and the gearing for actuating the two dashers, substantially as described.

3. The combination, with the vessel A and its cover, of the standard B, rigidly secured to the cover and carrying gear D, the shaft $C^2$, tube Z, and gears E F, the standard W, the swinging bracket thereon, held by set-screws and carrying the gear-wheels X $X^2$, and shaft X', for the purpose described.

In testimony whereof I affix my signature in presence of two witnesses.

WILLIAM W. RITCHEY.

Witnesses:
CHAS. RUCH,
A. E. MEININGER.